July 24, 1956 W. J. GODTEL 2,755,511
PORTABLE DECORTICATOR FOR RAMIE OR THE LIKE
Filed Nov. 12, 1953 2 Sheets-Sheet 1
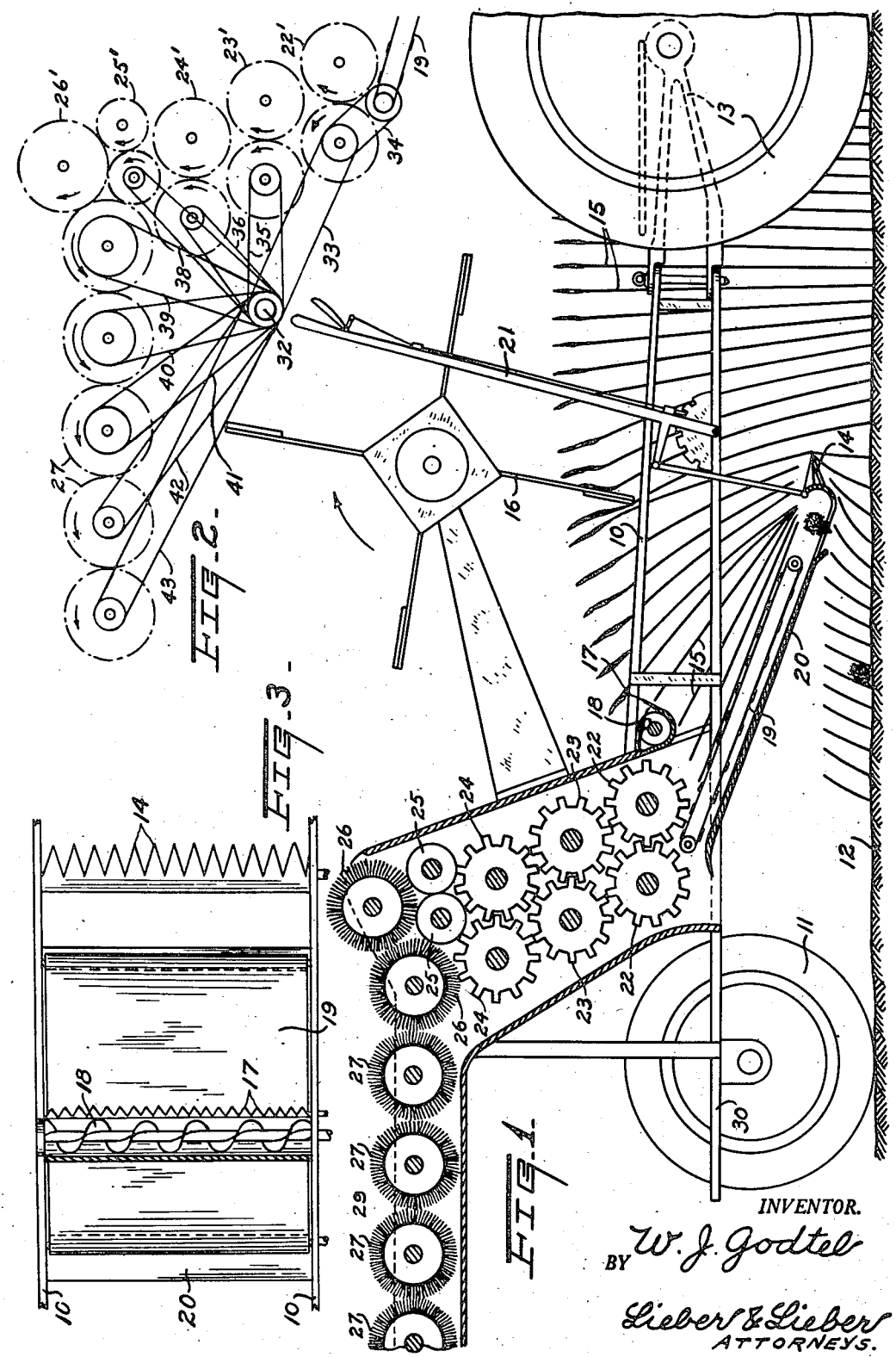
INVENTOR.
BY W. J. Godtel
Lieber & Lieber
ATTORNEYS.

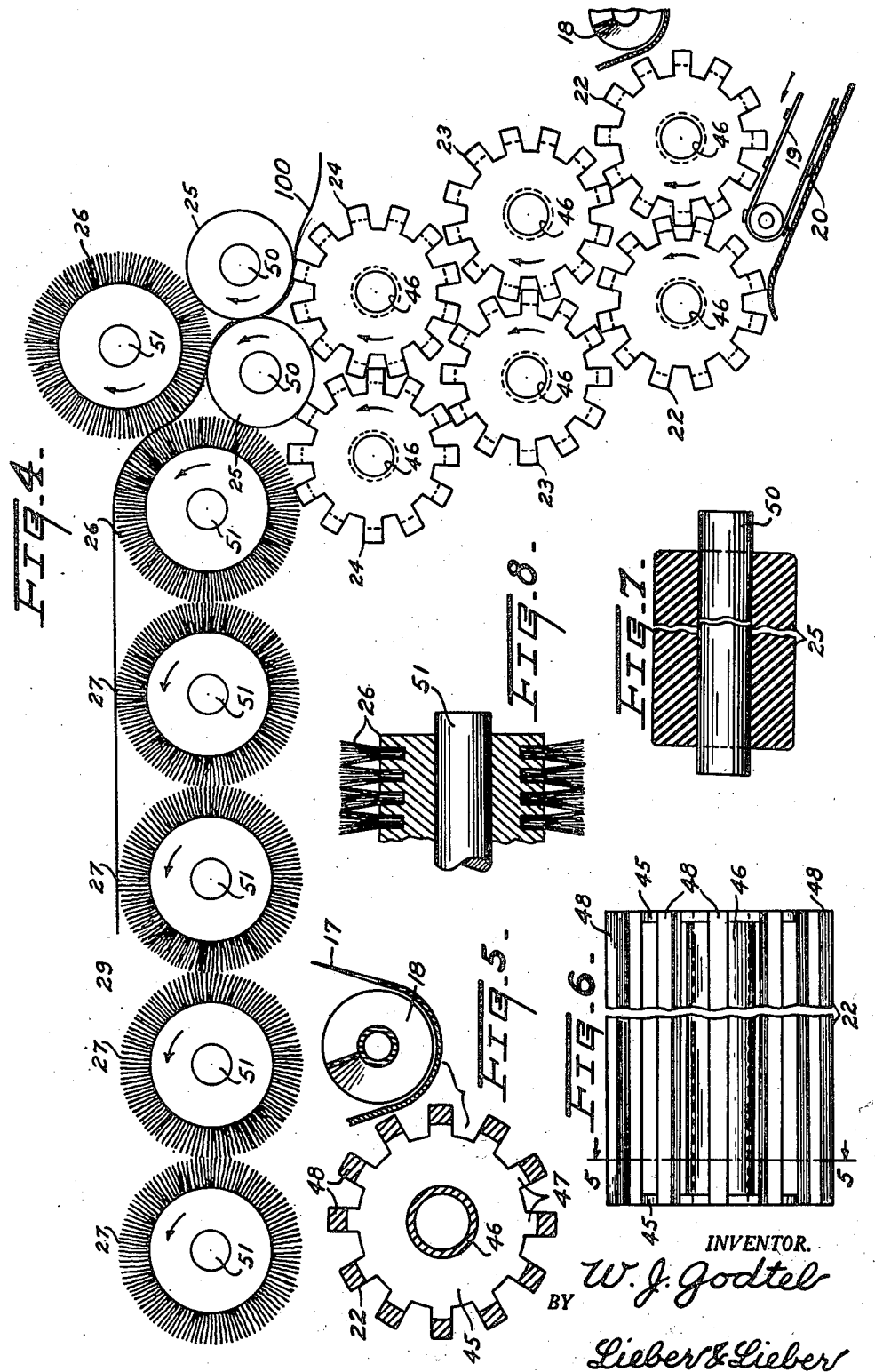

United States Patent Office 2,755,511
Patented July 24, 1956

2,755,511

PORTABLE DECORTICATOR FOR RAMIE OR THE LIKE

William J. Godtel, Mount Dora, Fla.

Application November 12, 1953, Serial No. 391,532

13 Claims. (Cl. 19—24)

The present invention relates in general to improvements in the art of treating the stalks of ramie, kenef and similar vegetation in order to remove the fibres thereof, but relates more specifically to improvements in the construction and operation of portable decorticating attachments adapted to be tractor drawn and to perform their function in the field while the crop of vegetation is being harvested, and the present application is a continuation in part of my prior application Serial No. 240,080, filed August 3, 1951, and now abandoned.

The primary object of this invention is to provide an improved portable harvesting and decorticating device for the fibrous stalks of ramie, kenef and similar vegetation, which is adapted to be attached as a unit to an ordinary tractor and to automatically decorticate the stalks in a most effective manner while also disposing of the refuse removed from the fibre.

Many kinds of vegetation have heretofore been harvested and treated in the field with the aid of mobile combines, in order to separate the useful ingredients from the others; and while it has previously been proposed to treat ramie with such equipment, these prior proposals have not been commercially successful due to the peculiar nature of this type of vegetation. Ramie is an ancient oriental product which is particularly valuable for its strong fibre capable of being spun and woven, but this commodity is very difficult to decorticate in order to obtain clean fibre ready for spinning or weaving. It has therefore been common early practice to roughly initially decorticate ramie by hand directly after it has been harvested, and to thereafter bale and ship the initially treated product to a factory for final de-gumming after the sap or gum has dried thoroughly. Since this treating method is slow, tedious and costly, only relatively small quantities of ramie were actually processed and used until recently when it was discovered that the useful fibre may in fact be de-gummed and cleaned immediately after the stalks have been harvested and before they have dried and the gum has set. The long and useful fibre is however confined to the stalks, and these stalks when being harvested have useless tops and frequently also have bird and insect nests clinging thereto, all of which must be removed before decortication of the stalks alone can be effected in a rapid and effective manner, but none of the prior ramie harvesting and decorticating combines have been adapted to properly remove this waste material.

It is therefore an important object of my present invention to provide a relatively simple and compact portable tractor attachment for most effectively harvesting ramie, for initially removing the tops and other undesirable substances from the stalks, and for promptly decorticating the latter so as to deliver clean fibre to a zone of convenient removal associated directly with the attachment.

Another important object of the present invention is to provide an improved ramie decorticating unit which is operable in the field in conjunction with improved stalk harvesting equipment, to rapidly and most effectively separate the clean and useful fibre from the refuse and to return the latter to the soil from which the stalks are cut.

A further important object of this invention is to provide an improved ramie decorticator which is capable of highly efficient field operation by a novice, and which embodies a novel and compact assemblage of parts relatively positioned and operable in a manner whereby the bark and husk is positively removed from the stalks while they are continuously advanced along a sinuous path.

Still another important object of this invention is to provide a portable and extremely durable decorticating mechanism comprising relatively few simple parts all of which are readily accessible for inspection, cleaning, and replacement if necessary, and in which sturdy intermeshing and self-cleaning decorticating rotors are utilized to de-fiberize the freshly cut ramie stalks and to discard the refuse.

These and other more specific objects and advantages of the invention will be apparent from the following detailed description from which it may be noted that the gist of the improvement is the provision of a harvesting and decorticating unit applicable as an attachment to any standard tractor or draft device, and wherein the ramie or kenef after being draped and severed from the stubble while the attachment is being drawn over the field, is initially felled so that the lower stalk portions drop over an open space for the gravity removal of bird and insect nests and the tops are removed and likewise returned to the field by an auxiliary cutter, while the stalks are deposited upon a conveyor which delivers them longitudinally between several superimposed sets of intermeshing and peripherally coacting crushing and disintegrating rolls operable at progressively higher speeds and which effectively remove the shives and hurds, and from the upper set of which the clean fibre is constantly withdrawn by a pair of snugly peripherally coacting resilient rollers and is presented to a series of revolving brushes also rotatable at progressively increased speed and adapted to transport the final product along an accessible picking zone directly associated with the advancing unit.

A clear conception of the features constituting my present improvements, and of the construction and operation of a ramie or kenef harvesting and decorticating unit embodying the invention, may be had by referring to the drawings accompanying and forming a part of this specification in which like reference characters designate the same or similar parts in the various views.

Fig. 1 is a relatively diagrammatic side elevation of a typical ramie harvester and decorticator, showing the same applied and being operated as an attachment to the draw-bar of an ordinary tractor;

Fig. 2 is a schematic side view of a driving arrangement for the various elements of the decorticating unit of Fig. 1;

Fig. 3 is a top view of the harvesting and initial stalk conditioning and feeding elements of the improved attachment;

Fig. 4 is an enlarged side elevation of the improved decorticating rolls, resilient fibre withdrawing rollers, and final fibre transfer brushes of the improved de-fiberizing attachment;

Fig. 5 is a further enlarged section through one of the lowermost improved decorticating rolls taken along the line 5—5 of Fig. 6, and also showing a similar section taken transversely through the top severing and removal screw conveyor of the unit;

Fig. 6 is a similarly enlarged fragmentary front view of the decorticating roll shown in Fig. 5;

Fig. 7 is a likewise enlarged and fragmentary longitudinal central section through one of the resilient fibre withdrawing rollers which cooperate with the uppermost set of decorticating rolls; and Fig. 8 is a similarly enlarged fragmentary central longitudinal section through one of the final rotary fibre collecting and transfer brushes disposed at the top of the unitary attachment and which are arranged side by side along the picking zone.

While the invention has been shown and described herein as being embodied in a tractor drawn attachment especially adapted to harvest and to decorticate ramie or kenef crops while the unit is being advanced over the field of growth, it is not desired to unnecessarily restrict the use of all of the improved features to such a device; and it is also contemplated that specific descriptive terms be given the broadest possible interpretation consistent with the actual disclosure.

Referring to the drawings, the improved ramie harvesting and decorticating unit shown therein by way of illustration, comprises in general, a sturdy main frame 10 having supporting wheels 11 and adapted to be coupled to and advanced along the ground 12 by a conventional tractor 13 or the like; a forwardly extending main stalk reaper or sickle 14 extending across the path of advancement of the unit near the ground 12 and being operable to sever the stalks 15 from the stubble while the upright stalks are being draped rearwardly by a revolving reel 16 journalled on the frame 10; an auxiliary heading or top removing sickle 17 also spanning the path of advancement of the unit for cutting the tops off of the descending severed stalks 15, and cooperating with a transverse revolving conveyor screw 18 to deliver the severed tops upon the ground 12 by gravity laterally of the frame 10; an inclined endless belt conveyor 19 for receiving the successive beheaded ramie stalks 15 and for advancing them upwardly toward the decorticating mechanism, and having its lower end separated from the main stalk severing sickle 14 by an open space formed in a pivotally suspended main sickle and belt conveyor mounting plate 20; a manually operable adjusting lever 21 for swinging the plate 20 about its pivot to raise or lower the main sickle 14 and the lower end of the conveyor 19; several superimposed sets of decorticating rolls carried by the frame 10 above the upper pivoted end of the belt conveyor 19; a pair of peripherally contacting resilient rollers coacting with the uppermost set of the decorticating rolls to constantly withdraw the fibre from the decorticating mechanism; and a series of parallel revolving fibre collecting and transfer brushes cooperating with the upper resilient rollers to spread the finished fibre along a picking zone associated with the upper rear portion of the unit.

The construction of the initial harvesting portion of the improved attachment is especially important in order to insure proper severing of the lower ends of the stalks 15 without waste of valuable fibre as close to the ground 12 as possible, and to also remove the useless tops and to return them to the soil as forage, while the open space between the lower end of the belt conveyor 19 and the sickle bar 14 permits bird and insect nests which usually adhere to medial and lower portions of the stalks 15 to drop freely to the ground 12 as the severed stalks descend and strike the upwardly advancing upper deck of the conveyor 19 as clearly illustrated in Figs. 1 and 3. The stalks 15 are therefore in relatively clean condition and free from adhering debris as they are delivered in succession longitudinally toward the decorticating mechanism for removing the bark, husks, shives and hurds from the useful fibre.

The improved decorticating mechanism may be mounted upon the main frame 10 of the attachment in any suitable manner within a protective housing which is preferably freely open at its lower end as shown in Fig. 1, and this mechanism comprises two or more sets of peripherally coacting and intermeshing rolls of special construction. As depicted in Figs. 1 and 4, an initial set of lower stalk feeding and crushing rolls 22 is positioned in proximity to the upper delivery end of the belt conveyor 19 so as to receive and to advance the successive cut stalks 15 between the intermeshing peripheries of the rolls 22, and this initial set of lower rolls 22 has outer peripheral surfaces which snugly coact with similar peripheral surfaces of an intermediate set of rolls 23. The peripheries of the intermediate rolls 23 also intermesh, and the outer peripheral surfaces of the rolls 23 also snugly coact with similar peripheral surfaces of the upper set of rolls 24 which likewise have intermeshing peripheries. While all of the rolls 22, 23, 24 are of identical construction as will be explained later, the intermediate rolls 23 are rotatable at higher speed than the lower rolls 22, and the upper rolls 24 are rotatable at a much higher speed than the intermediate rolls 23 so as to produce an effective stalk crushing and fibre cleaning action at the intermeshing portions and at the contacting outermost peripheral surfaces of the successive superimposed roll sets between which the ramie stalks 15 advance longitudinally along a sinuous path.

The peripherally contacting rollers 25 must have very intimate peripheral engagement with each other in order to withdraw the clean fibre from the decorticating mechanism and to deliver this fibre to the collecting and transfer brushes while preventing any wads of uncrushed undecorticated stalk tails from being thus delivered; and the outer peripheral surfaces of the upper set of decorticating rolls 24 preferably revolve in snug engagement with the peripheries of the fibre discharge rollers 25 in order to remove uncrushed butts or stalk tails from which the wholesome fibre has been separated by the rollers 23 and 24. This construction and cooperation of the rolls 24 and rollers 25 is very important in order to remove wads formed by uncrushed stalk tails from clogging the stream of cleansed fibre; and the initial pair of revolving brushes 26 which coact with the peripheries of the resilient draw rollers 25 and with each other to collect the finished fibre, are rotatable at slightly higher peripheral speeds than the rollers 25 and cooperate with a series of parallel similar rotating brushes 27 operating at progressively increased speeds, to transfer the finished product along an upper removal or picking zone 29 extending rearwardly of the unit above a rear platform 30.

When the ramie fiber 100 leaves the uppermost set of intermeshing decorticating rollers 24 the leading end of the fiber passes between a pair of resilient rollers 25 which rotate at a speed slower than the decorticating rollers resulting in the trailing end of the fiber being bunched up at the nip of the rollers 25 and being thrown outwardly of the top set of rollers 24 as shown in Figure 4. As the ramie 100 is then fed or pulled by the resilient rollers 25 the trailing or butt end of the stalk fiber 100 is decorticated between the bars 48 carried by the top set of decorticating rollers 24 and the resilient rollers 25, thereby completely decorticating a stalk fiber.

As hereinabove indicated, the various rolls, rollers and brushes are rotatable at various differential speeds in order to effectively perform their intended functions, and these elements may be simultaneously driven from any suitable source 32 of power, as shown schematically in Fig. 2, it being understood that this power source 32 may either be the propelling engine of the tractor 13 or a separate power unit carried by the platform 30 of the attachment. As shown in Fig. 2, the lower crushing rolls 22 may be rotated by an endless drive 33 at a peripheral speed slightly above the ground travel speed of the attachment, and the endless conveyor 19 may be driven at approximately the same lineal speed as the peripheral speed of the rolls 22 by means of an endless drive 34, while the two rolls 22 of the lower set are positively rotated in opposite directions by intermeshing gears 22'. The intermediate decorticating rolls 23 may be rotated at a higher speed than that of the lower rolls 22, by means of another endless drive 35, and the two rolls 23 of this set are also positively rotatable in opposite directions by intermeshing gears 23', while the upper final decorticating and tails ejecting rolls 24 may be rotated at still higher speed than that of the intermediate rolls 23, by means of still another endless drive 36, and the two rolls 24 are likewise positively rotatable in opposite directions by intermeshing gears 24'.

The resilient fibre withdrawing rollers 25 are preferably rotated at a somewhat lower peripheral speed than that of the upper decorticating rolls 24, by means of an endless drive 38, and are positively rotatable in opposite directions by intermeshing gears 25', and the fibre collecting brushes 26 may be driven in opposite directions by gearing 26' and at approximately the same peripheral speed as that of the rollers 25 by means of another endless drive 39. The fibre transfer brushes 27 are independently rotatable at progressively higher speeds and in the same directions by means of endless drives 40, 41, 42, 43 so as to present the finally cleaned fibres to the picking zone 29 where they may be removed by hand or otherwise, by one or more attendants stationed on the platform 30 of the unit, and there may be any desired number of these transfer brushes 27.

As more definitely depicted in Fig. 4 the several sets of crushing and decorticating rolls 22, 23, 24, the rollers 25, and the brushes 27, 26 are arranged for peripheral coaction so as to constantly advance the stalks 15 and the fibres derived therefrom continuously and longitudinally along a sinuous path between the successive roll sets and rollers; and the initial crushing rolls 22 and the subsequent crushing and decorticating rolls 23, 24 are all of like construction and the rolls of each of these sets are hollow and have intermeshing peripheral portions which cause the material to advance longitudinally of the stalks along such path while permitting the debris comprising the bark and husks to gravitate freely through these hollow rolls onto the ground 12. The specific construction and coaction of the rolls 22, 23, 24 is therefore extremely important in order to insure proper automatic decortication of the stalks 15 and continuous advancement of the fibre.

As illustrated in Figs. 5 and 6, showing the specific construction of one of the rolls 22, each of the rolls 22, 23, 24 has spaced toothed or end heads 45, mounted upon a central driving shaft 46 and formed with integral radial peripheral projections 47 to which parallel crossbars 48 are rigidly attached as by welding, to provide intervening open spaces free from obstruction. These intervening spaces are open to the hollow interior of each roll so that bark, husks, shives, or other debris removed during the stalk decorticating operation may fall freely through each roll and no wrapping of the fiber around the peripheries of the decorticating rolls results due to the opposite direction of rotation of the rolls of each set and the progressively increased speed of the rolls of the successive sets. Then too, the outer peripheral surface of each of the bars 48 must be accurately machined so as to snugly coact with the corresponding surfaces of the rolls of the adjacent set or sets in order to insure thorough wiping and cleaning and constant upward travel of the fiber from the lower rolls 22 to the intermediate rolls 23 and from the latter to the upper rolls 24 and from thence between the fibre discharge rollers 25, and this cooperation of the rolls and rollers has proven highly satisfactory and successful even when operating at high speeds. The peripheral outer surfaces of the upper rolls 24 also snugly coact with the peripheries of the resilient rollers so as to positively remove the tails of the stalks from which the clean fibre has been forcibly pulled by the rollers 25, and which cannot pass between these fibre discharge rollers.

The two peripherally contacting fibre delivery rollers 25 are preferably formed of resilient material such as rubber, and are mounted upon driving shafts 50 as shown in Figs. 4 and 7; while the fibre collecting and transfer brushes 26, 27 are all of like construction as shown in Fig. 8, and are mounted upon drive shafts 51. The initial pair of peripherally coacting brushes 26 function to remove the clean fibre from the peripheries of the adjacent resilient rollers 25 and to deliver this fibre longitudinally upon the adjacent transfer brush 27; and these brushes 27 due to their rotation at progressively higher speeds, spread the finished fibre along the picking zone 29 where it can be readily removed by one or more attendants stationed upon the platform 30 of the advancing unit.

While the normal operation of the improved harvesting and decorticating attachment should be apparent from the foregoing description of the construction and cooperation of the various parts, a short résumé of such operation is as follows: When the unit is being drawn along the ground 12 by the tractor 13 and the various cutters 14, 17, conveyors 18, 19, reel 16, rolls 22, 23, 24, rollers 25, and brushes 26, 27 are being actuated or rotated in the directions indicated, the revolving reel coacts with the main sickle or cutter 14 to sever the ramie or kenef stalks 15 from the stubble and to swing them rearwardly and downwardly so that the tops of the descending stalks 15 will be removed by the auxiliary sickle or cutter 17 and will be returned to the ground 12 by the screw conveyor 18, while bird and insect nests will likewise be permitted to fall onto the ground through the open space between the belt conveyor 19 and the main cutter 14. The successive bare and beheaded stalks 15 will then drop upon the upper deck of the belt conveyor 19 which transports them longitudinally toward and between the lower set of crushing rolls 22.

The intermeshing teeth or bars 48 of these lower rolls 22 initially crush the stalks and remove some bark and husk which drops through the hollow interiors of the rolls 22 and eventually falls to the ground, while the crushed fibre stalks are delivered longitudinally to the next higher crushing and decorticating rolls 23. During this transfer, the peripherally contacting outer surfaces of the adjacent rolls 22, 23 wipe some of the previously loosened bark and shives from the fibre and permit this debris to fall through these hollow rolls, and as the stalks 15 pass longitudinally between the intermediate rolls 23 they are further crushed and decorticated. The rolls 23 thereafter deliver the stalks 15 minus most of the bark, husks, and shives to the upper set of decorticating rolls 24 where final wiping and cleaning of the fibre is effected by the intermeshing bars 48 and by the coaction between the outer peripheral surfaces of the adjacent rolls 23, 24. This wiping and cleansing action is due to the snug peripheral coaction between the successive adjacent rolls 22, 23, 24 of the several sets and to the progressively higher speeds of these rolls which also prevents the fibre from wrapping around these rolls, and in each case the loosened and removed debris falls to the ground through the hollow crushing and decorticating rolls 22, 23, 24.

The upper set of decorticating rolls 24 deliver the clean fibre longitudinally between the snugly coacting resilient rollers 25 which pull the fibres from the tail ends of the decorticated stalks while their ends are being decorticated between rollers 24 and 25 after the wad has been thrown out of the rolls 24, and since these tails cannot pass between the rollers 25, the rapidly revolving bars 48 of the rolls 24 and which contact the rollers 25, function to remove and to quickly discard such tail wads away from the path of advancement of the useful fibre. The stalks are thus crushed and thoroughly decorticated while traveling along a sinuous path between the successive sets of rolls 22, 23, 24 and the tails and other debris are effectively removed from the clean fibre, which is finally collected by the initial revolving brushes 26 and is delivered in the form of a top layer along the brushes 27 at the picking zone 29.

From the foregoing detailed description of the construction and operation of my device, it will be apparent that the invention provides a simple and compact harvesting and decorticating attachment for ramie or the like, which functions to automatically, continuously and effectively remove the stalks from the field of growth, to defiberize the same, to deliver the clean and useful fibre to a convenient place of removal, and to deposit the debris as forage back onto the ground. The improved unit has proven highly satisfactory and successful in actual use and makes it commercially possible to decorticate vegetation such as ramie, kenef, or the like which it has heretofore been impossible to successfully treat on the field at moderate cost.

It should be understood that it is not desired to limit this invention to the exact details of construction and operation of the harvesting and decorticating unit herein specifically shown and described, for various modifications within the scope of the appended claims may occur to persons skilled in the art.

I claim:

1. In a ramie stalk decorticator, several superimposed sets of hollow crushing and decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a wiping action between said engaging outer surfaces, and means for feeding the stalks longitudinally between the rolls of the lower set and for withdrawing the decorticated fibre from between the rolls of the upper set.

2. In a ramie stalk decorticator, several superimposed sets of hollow crushing and decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a wiping action between said engaging outer surfaces, means for feeding stalks longitudinally between the lower set of said rolls, and means for pulling the clean decorticated fibre longitudinally away from the upper set of said rolls.

3. In a ramie stalk decorticator, several superimposed sets of hollow crushing and decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a wiping action between said engaging outer surfaces, means for topping the stalks and for feeding the same longitudinally between the lower set of said rolls, and a pair of snugly peripherally coacting rollers for pulling the clean decorticated fibre longitudinally away from the upper set of said rolls.

4. In a ramie stalk decorticator, several superimposed sets of hollow crushing and decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a wiping action between said engaging outer surfaces, means for topping the stalks and for feeding the same longitudinally between the lower set of said rolls, and a pair of snugly peripherally coacting resilient rollers for pulling the clean decorticated fibre longitudinally away from the upper set of said rolls, said rollers being positioned to cooperate with said upper set of rolls so that the difference in relative peripheral speeds leads tail ends to follow said rolls past their contact point with said resilient rollers, cleaning and decorticating said tails as they are pulled back through the contact point.

5. In a ramie stalk decorticator, several superimposed sets of hollow crushing and decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a wiping action between said engaging outer surfaces, means for topping the stalks and for feeding the same longitudinally between the lower set of said rolls, a pair of snugly peripherally coacting rollers for pulling the clean decorticated fibre longitudinally away from the upper set of said rolls, and revolving brushes contacting the peripheries of the adjacent resilient rollers to collect and remove the clean fibre therefrom.

6. In a ramie stalk decorticator, several successive sets of hollow rolls each having an annular series of peripheral teeth separated by open spaces and provided with outer cylindrical surfaces the bars of each roll meshing with the spaces of the other roll of the same set and the outer cylindrical surfaces of each roll snugly engaging the said surfaces of the adjacent rolls of the adjoining set on opposite sides of the points of intermesh of said teeth and spaces, means for rotating said rolls of each set in opposite directions away from said points of intermesh and toward said points of peripheral engagement, means for feeding stalks longitudinally between one end set of said rolls, a pair of peripherally contacting resilient rollers each of said rollers being in peripheral contact with the bars of the terminal set of said hollow rolls for pulling clean fibre away from the said terminal set of said rolls, and a series of revolving brushes coacting with the peripheries of said rollers to collect and transfer the finished fibre therefrom along a picking zone.

7. In a ramie stalk decorticator, several successive sets of hollow rolls each having an annular series of peripheral teeth separated by open spaces and provided with outer cylindrical surfaces the bars of each roll meshing with the spaces of the other roll of the same set and the outer cylindrical surfaces of each roll snugly engaging the said surfaces of the adjacent rolls of the adjoining set on opposite sides of the points of intermesh of said teeth and spaces, means for rotating said rolls of each set in opposite directions away from said points of intermesh and toward said points of peripheral engagement, means for feeding stalks longitudinally between one end set of said rolls, a pair of peripherally contacting resilient rollers each of said rollers being in peripheral contact with the bars of the terminal set of said hollow rolls for pulling clean fibre away from the said terminal set of said rolls, and a series of revolving brushes coacting with the peripheries of said rollers to collect and transfer the finished fibre therefrom along a picking zone, the successive brushes of said series being revolvable at progressively higher speeds.

8. In a ramie stalk decorticator, several successive sets of crushing and decorticating rolls each having peripheral teeth meshing with the spaces between the teeth of the other roll of the same set to grip and oppositely indent and to feed fibrous stalks from one of said sets of rolls to the next succeeding set, the rolls of the successive sets being rotatable at progressively higher speeds and the rolls of each set being revolvable in opposite directions at the same speed, means for feeding fresh cut fibrous vegetation stalks between the rolls of one end set, a pair of snugly engaging resilient rollers for pulling the useful fibre from between the other end set of said rolls, a pair of oppositely revolving brushes for collecting the finished fibre from the peripheries of said rollers, and a series of parallel peripherally coacting fiber transfer brushes rotatable at progressively increased speed, the slowest revolving brush of said series having peripheral coaction with one of said pair of brushes.

9. For use with a harvester having a stalk cutter and conveyor, a stalk decorticator adapted to be positioned to receive severed stalks from said conveyor comprising pairs of hollow rollers each of which comprises a shaft, a pair of toothed heads axially spaced apart on said shaft and secured for rotation therewith, stalk decorticating means carried by the teeth of said heads in circumferentially spaced parallelism, each roller of a pair intermeshing with its companion roller, each roller of each pair of rollers being separated from a roller of a cooperating pair of rollers a distance only sufficient to permit of rotation of said rollers and means associated with said rollers for rotating one of each pair of rollers in a clockwise direction and rotating the other roller of said pair counterclockwise.

10. A stalk decorticator as claimed in claim 9 further comprising a pair of resilient rollers positioned at the end of said pairs of decorticating rollers, means associated with said resilient rollers for rotating said resilient rollers at a speed of rotation less than the speed of said decorticating rollers whereby the trailing end of fibre fed to said resilient rollers is driven outwardly between one of said resilient rollers and a decorticating roller to complete decortication of the butt end of the fiber.

11. For use with a harvester having a stalk cutter and conveyor, a stalk decorticator adapted to be positioned to receive severed stalks from said conveyor comprising pairs of hollow rollers each of which comprises a shaft, a pair of toothed heads axially spaced on said shaft and secured for rotation therewith, stalk decorticating means carried by the teeth of said heads in circumferentially spaced parallelism, each roller of a pair intermeshing with its companion roller, the decorticating means on each roller being substantially in peripheral contact with the decorticating means of a pair of cooperating decorticating rollers, and means associated with said rollers for rotating one of each pair of rollers in a clockwise direction and rotating the other roller of said pair counterclockwise.

12. In a ramie stalk decorticator several superimposed sets of hollow crushing end decorticating rolls each having an annular series of peripheral bars separated by open spaces communicating with the roll interior and provided with outer cylindrical surfaces, the bars of each roll meshing with the spaces between bars of the roll of the same set and the outer cylindrical surfaces of each roll being snugly engageable with the said surfaces of the adjacent rolls of the adjoining set, means for revolving the rolls of successive sets at progressively higher speeds to provide a whipping action between said engaging outer surfaces, a cutter for topping said stalks, a conveyor positioned to receive the tops from said cutter and disposing of same to one side of said decorticator, means for feeding the stalks longitudinally between the lower set of said rolls, and a pair of snuggly peripherally co-acting rollers for pulling the clean decorticated fiber longitudinally away from the upper set of said rollers.

13. For use with a decorticator, a line fiber recovery device comprising a plurality of circular transfer brushes having fiber bristles with at least their outer portions extending radially of the brushes, the free radial tips of the bristles of all of said brushes having a substantially common tangent line, and means connected to rotate said brushes at progressively increasing peripheral speeds from the brush adjacent the decorticator to the brush most remote from the decorticator whereby the free radial tips of the bristles of each succeeding brush advance the fiber substantially along said line.

References Cited in the file of this patent

UNITED STATES PATENTS

| 11,654 | Warner | Sept. 5, 1854 |
| 442,586 | Landtsheer et al. | Dec. 9, 1890 |
| 494,176 | Smith | Mar. 28, 1893 |
| 520,983 | Favier | June 5, 1894 |
| 653,663 | Crowell | July 17, 1900 |
| 811,726 | Klauk et al. | Feb. 6, 1906 |
| 1,722,110 | Pritchard | July 23, 1929 |
| 2,571,108 | Burkardt | Oct. 16, 1951 |
| 2,624,918 | Brereton | Jan. 13, 1953 |
| 2,654,916 | Wright et al. | Oct. 13, 1953 |